Oct. 10, 1939.  W. C. DODD  2,175,747

PHARMACEUTICAL DEVICE

Filed Sept. 2, 1938

William C. Dodd
INVENTOR

BY Victor J. Evans & Co.
ATTORNEYS

Patented Oct. 10, 1939

2,175,747

UNITED STATES PATENT OFFICE 2,175,747

PHARMACEUTICAL DEVICE

William C. Dodd, Bald Knob, Ark.

Application September 2, 1938, Serial No. 228,250

2 Claims. (Cl. 73—165)

My invention relates to improvements in pharmaceutical devices and more particularly to pharmaceutical devices for the measuring and dispensing of ointments and the like.

One of the principal objects of my invention is to provide a pharmaceutical device so constructed and arranged as to accurately measure and dispense ointments and the like therefrom.

Another object of my invention is to provide a device of the above described character which is simple in construction, durable in use, efficient in operation and economical in manufacture.

Other objects and advantages will be apparent from the following description, appended claims and annexed drawing.

Referring to the drawing wherein like reference characters designate like parts throughout the several views.

Figure 2:
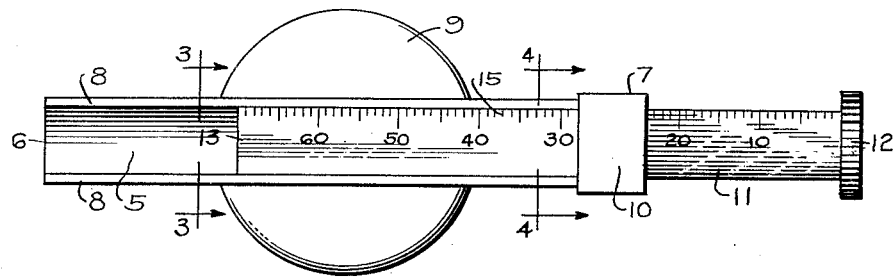
Figure 2 is a top plan view thereof.
Figure 3:
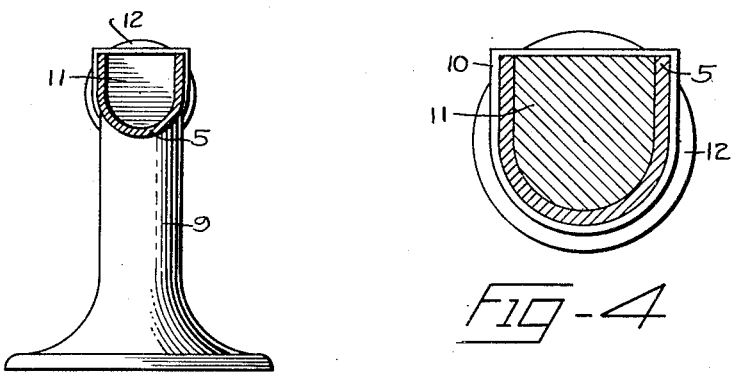
Figure 4:
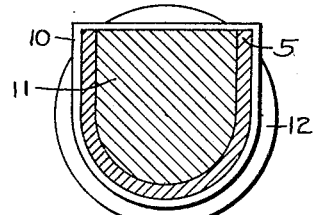

Figures 3 and 4 are sectional views taken on the lines 3—3 and 4—4 of Figure 2 respectively.

In practicing my invention I provide a U-shaped trough 5 formed with open ends 6 and 7 and upper horizontally disposed faces 8. Said trough is mounted on a standard 9 for supporting said trough in a horizontal position. Said standard is so arranged as to constitute a handle for said trough. The end 6 of the trough constitutes the discharge end thereof and the opposite end 7 is provided with a band 10 embracing said end and overlying the faces 8 thereof. The band 10 serves as a guide for a U-shaped solid plunger 11 slidable within said trough. The plunger is fashioned on one end with a finger piece 12 adapted to engage the outer face of the band to limit the inward movement of the plunger and on the opposite end with a vertically disposed face 13.

On one side of said trough subjacent the face 8 thereof there is provided an apothecary's scale 14. The upper flat face of the plunger is provided with a metric scale 15 for a purpose hereinafter set forth.

Figure 1:
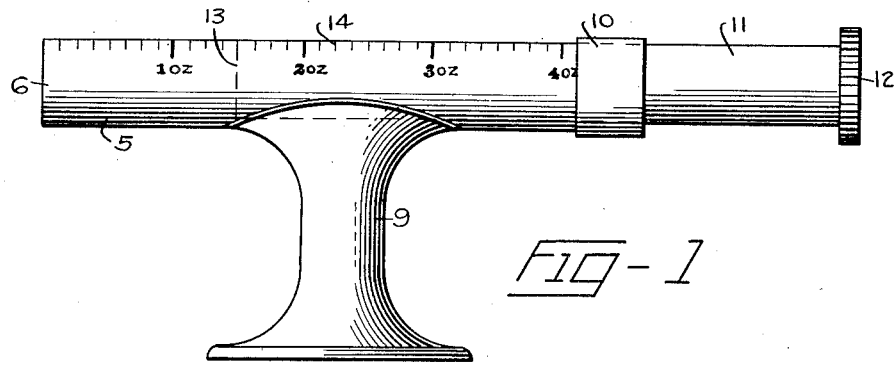
Figure 1 is a side elevation of my invention.

In use, the plunger is moved outwardly until the vertically disposed face 13 registers with a desired scale reading on the apothecary's scale 14 as illustrated in dotted lines in Figure 1. If metric measure is desired, the plunger is similarly moved outwardly to register a desired scale reading with the inner transversely extending face of the band 10 as illustrated in Figure 2. When the plunger is thus adjusted ointment or the like is pressed within the trough between the discharge end 6 thereof and the vertically disposed face 13 of said plunger.

Said ointment is leveled horizontally relative to the faces 8 and vertically relative to the face of the end 6 of the trough. When the ointment or the like is thus measured the plunger is operated inwardly to effect discharge of said ointment through the discharge end of the trough.

From the foregoing it will be apparent that I have provided a simple and accurate measuring and dispensing device for ointment and the like and which may be readily disassembled for cleaning purposes whereby to insure a high degree of sanitation. While I have shown and described my invention in connection with the measuring and discharge of ointment and the like, it is to be distinctly understood that other ingredients and mixtures may also be measured and dispensed therefrom without departing from the spirit of the invention or scope of the appended claims.

What I claim is:

1. A device of the character described, comprising, a trough having open ends and provided with scale readings along one side thereof, a band encircling one of said ends and constituting a guide, a plunger slidable within said trough and extending through said guide, said plunger having an end wall for registry with said readings to permit adjustment of said plunger within said trough to effect a desired capacity of the latter whereby ointment and the like may be measured within said trough between said other end and said end wall and dispensed therefrom by said plunger, a standard secured subjacently to said trough for supporting the latter in a horizontal position during measuring of ointment therein and constituting a handle for holding said trough when ointment is dispensed from said trough.

2. A device of the character described, comprising, a trough having open ends, a band encircling one of said ends and constituting a guide, a plunger slidably mounted within said trough and extending through said guide and having scale readings adapted for registry with said band, said plunger having an end wall adjustable relative to one of the ends of said trough to effect a desired capacity of the latter upon registry of one of said scale readings with said band whereby ointment and the like may be measured within said trough between said other end and said end wall and dispensed therefrom by said plunger, a standard secured subjacently to said trough for supporting the latter in a horizontal position during measuring of ointment therein and constituting a handle for holding said trough when ointment is dispensed from said trough.

WILLIAM C. DODD.